April 14, 1959 P. BJERRE 2,881,956
DISTRIBUTOR
Filed March 4, 1957 4 Sheets-Sheet 1

INVENTOR.
PEDER BJERRE
BY James E. Nilles
ATTORNEY.

April 14, 1959
P. BJERRE
2,881,956
DISTRIBUTOR
Filed March 4, 1957
4 Sheets-Sheet 2
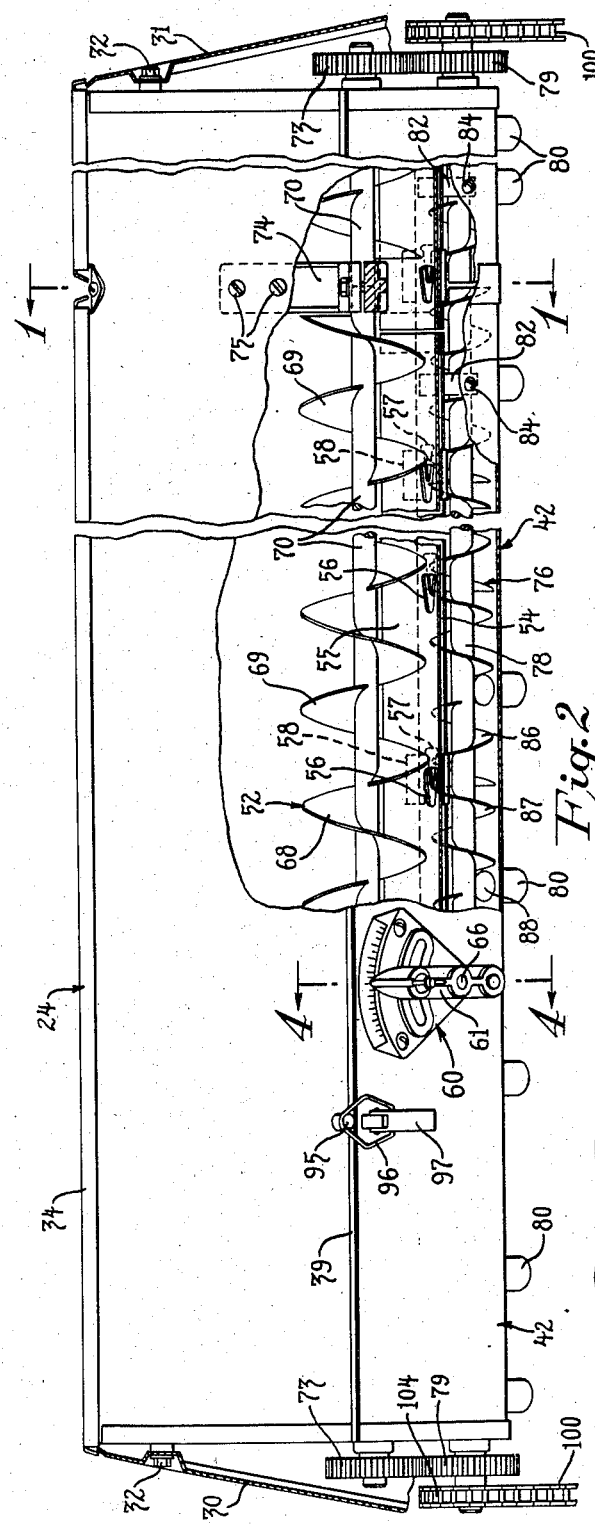
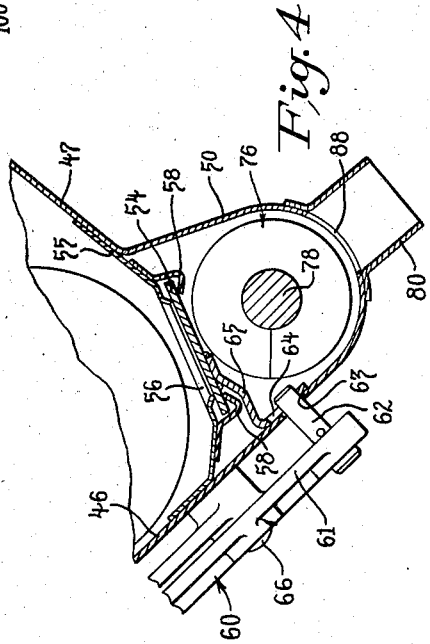
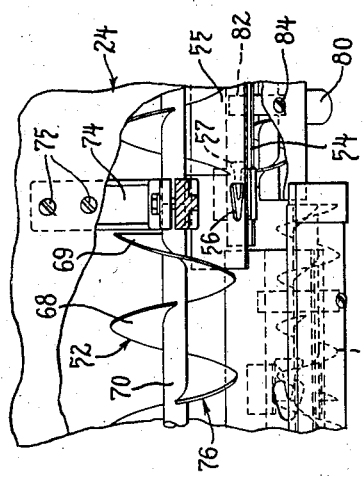
INVENTOR.
PEDER BJERRE
BY
James E. Nilles
ATTORNEY.

April 14, 1959 P. BJERRE 2,881,956
DISTRIBUTOR
Filed March 4, 1957 4 Sheets-Sheet 4

INVENTOR.
PEDER BJERRE
BY
James E. Nilles
ATTORNEY.

United States Patent Office 2,881,956
Patented Apr. 14, 1959

2,881,956

DISTRIBUTOR

Peder Bjerre, Toronto, Ontario, Canada, assignor to Massey-Ferguson Inc., a corporation of Maryland Application March 4, 1957, Serial No. 643,755

5 Claims. (Cl. 222—185)

This invention relates generally to agricultural implements and more particularly to spreading or dispensing mechanisms for fertilizer, seed or the like. The invention finds particular utility in grain drills where an agitator in the material hopper is driven to cause the material to flow through a metering shutter and thereby vary the rate of application.

When highly corrosive and/or cohesive materials are used in distributors of this general type, it is essential to be able to easily disassemble the mechanism for complete cleaning at the end of the day or other period of use.

It is a general object to provide an improved distributing mechanism.

It is a more specific object of this invention to provide a distributor of the above general type in which the entire bottom of the material hopper together with the metering mechanism and outlets can be easily disconnected from the main portion of the hopper.

Other objects and advantages will become more apparent as this disclosure progresses, reference being had to the accompanying drawings in which:

Figure 2 is rear, elevational view, with parts broken away or in section for clarity of the drawing, of the device shown in Figure 1, but on a smaller scale.

Figure 3 is a rear, elevational, fragmentary view of the central portion of Figure 2, but on an enlarged scale, certain parts being broken away for clarity, and showing the left half of the hopper bottom swung to the partially open position.

Figure 4 is an end elevational view, in section, taken generally on line 4—4 of Figure 2 and showing the metering shutter adjusting means.

Figure 5:
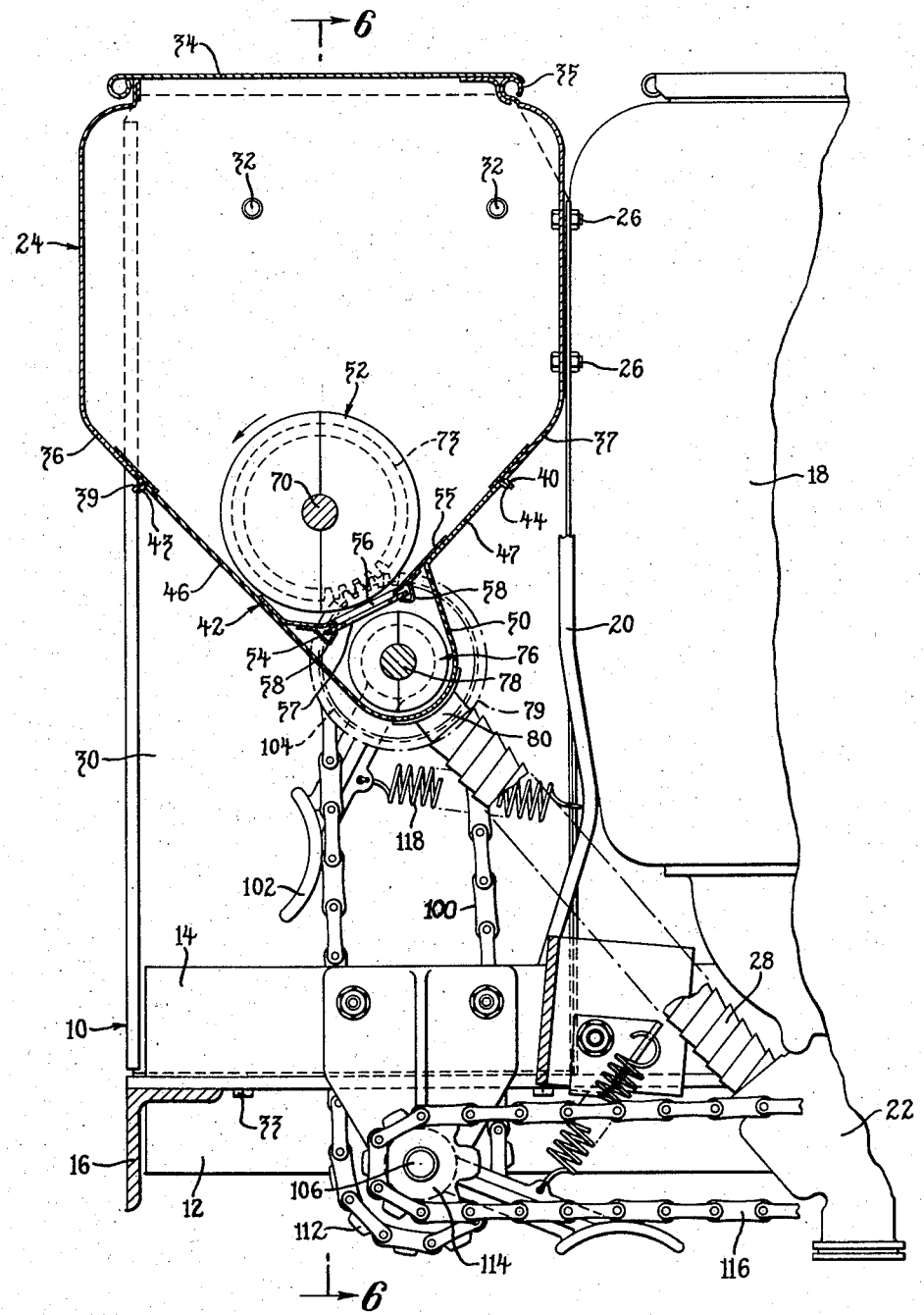
Figure 5 is a right end, elevational view, in section, showing the hopper of Figure 1 as attached to a grain drill and the drive to the agitator feed mechanism.
Figure 6:
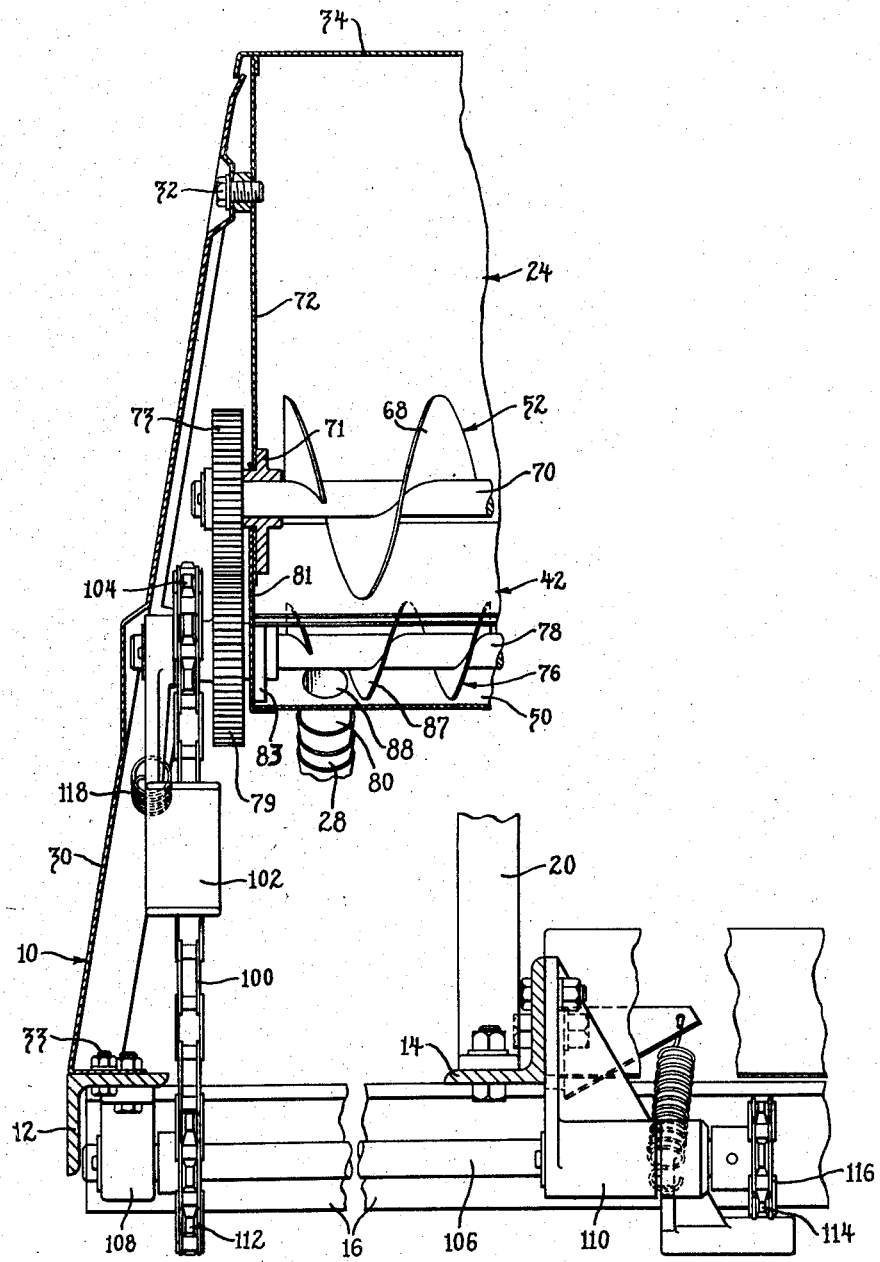
Figure 6 is a fragmentary sectional view taken in the direction of line 6—6 in Figure 5.

Referring in greater detail to the drawings, and particularly Figures 5 and 6, the supporting frame 10 of the implement includes a fore and aft extending angle iron member 12 on each side of the machine (only one shown), a pair of intermediate fore and aft extending angle iron members 14 (only one shown), and a rear transversely extending angle iron member 16 all of which are rigidly secured together in any suitable manner. This framework forms no part of the present invention but if more detail is deemed necessary as to the type of implement with which this invention is useable, reference may be had to my U.S. Patent Number 2,768,773, issued October 30, 1956, entitled, "Grain Drill." It is believed sufficient to say this framework is adapted to be drawn over the ground on a pair of laterally spaced ground wheels (not shown). A large grain hopper 18 is rigidly secured to the supporting framework by brackets 20, and is adapted to deliver seed into the funnel 22 for ultimate deposit in the ground.

Another hopper 24 is secured by bolts 26 to the rear side of hopper 18 and is adapted to feed material, such as fertilizer, into the funnel 22 also, through the flexible, telescoping tubes 28. Hopper 24 is also rigidly and fixedly supported to the support frame 10 by means of a support member at each end in the form of the sheet metal plates 30, 31, which are secured by bolt means 32 at their upper ends to hopper 24 and by bolt means 33 to the frame 10 at their lower ends. The hopper 24 is usually quite long and in itself of considerable weight. It is capable of carrying a considerable amount of material which is loaded therein through the top cover 34 pivoted at 35.

Hopper 24 has two downwardly converging bottom edges 36, 37 which terminate in an outwardly turned flange 39, 40 respectively. The bottom of hopper 24 is formed as two similar trough portions 42, a right and left half, and reference will be made only to one, it being understood that like numerals apply to like parts. The bottom trough 42 has a rear flange 43 which is adapted to abut against flange 39 when hopper 24 is closed and also has a front flange 44 similarly abutting against flange 40 when in that position. Trough 42 has downwardly converging sides 46, 47 which terminate in and are formed integrally with a generally semi-circular, channel shaped sub-trough 50. It will be noted that sub-trough 50 is offset forwardly from the vertical longitudinal center of hopper 24.

The upper rotary feed member 52 rotates in the direction indicated by the curvilinear arrow as shown in Figure 5 and by locating the metering shutter 54 on the foremost side of the vertical longitudinal center line of the feed member 52 in respect to its direction of rotation at its lower side, more positive feeding of material therethrough is assured. The front or foremost side has been found to be the "pressure free" side, that is, free of pressure of material against the hopper bottom caused by the rotating member 52. Stated otherwise, the material at the opposite or rear side of this center line is forced against the hopper bottom by the feed member 52, thereby causing binding or compaction of the material in that area.

Figure 1:
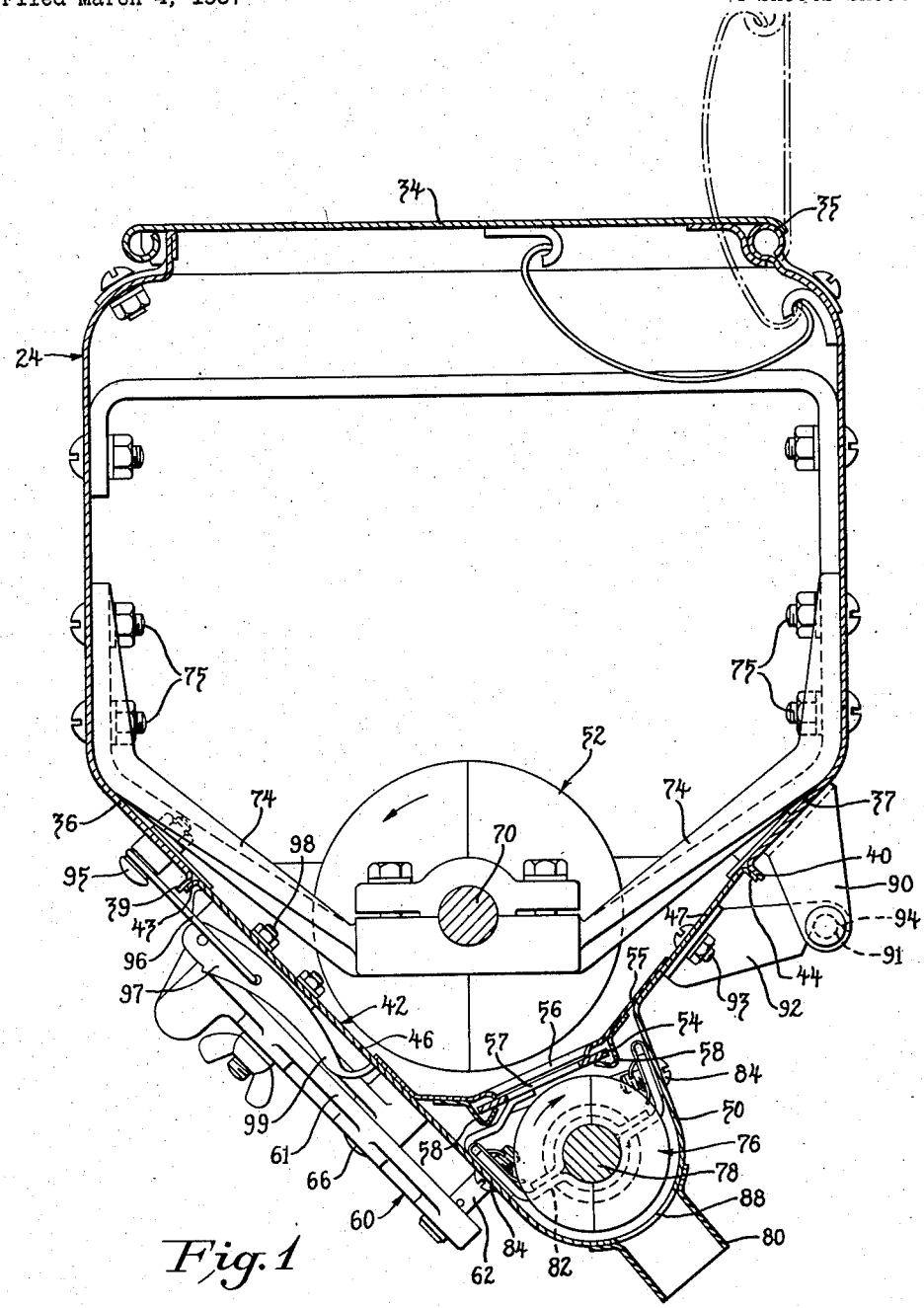
Figure 1 is an end elevational view, in section, of a hopper embodying this invention, taken on line 1—1 of Figure 2.

As best shown in Figures 1 and 4, a bottom plate 55 is secured, as by spot welding, in trough 42 and above sub-trough or hopper 50, thereby in effect making two separate hoppers. Plate 55 has a plurality of longitudinally spaced feed openings 56 along its length which are registrable in variable degrees with the spaced apertures 57 in the shutter 54. Shutter 54 is mounted for longitudinal shifting movement relative to plate 55 by means of brackets 58 which are spaced along the length of plate 55 and rigidly secured thereto. The rate of application of the material is determined by the setting of the index mechanism 60 and more particularly the lever 61 which is connected with shutter 54 by the pin 62 extending through a slot 63 in sub-trough 50. Pin 62 also extends into a slot 64 in the arm 65 which in turn is welded to the shutter. Thus, as lever 61 is pivoted about point 66, it shifts the shutter in one direction or the other to vary the degree of registration between apertures 56 and 57 in the well known manner.

Feed member 52 is comprised of identical halves and therefore only one will be described. A plurality of oppositely pitched screw elements 68, 69 are welded to shafts 70 and act to move the material axially in both directions across the openings 56. Shafts 70 are journalled at their outer ends in bearings 71 fastened to the hopper sides 72 and protrude therethrough where a pinion gear 73 is fixed thereon. The inner ends of shafts 70 are journalled in a bearing bracket 74 which is secured by bolt means 75 to the center of hopper 24.

Another rotary feed member 76 is mounted within each half portion of the sub-troughs 50 and comprises a shaft 78 journalled at its outer end in a bearing 83 secured to side wall 81. The inner end of shaft 78 is journalled in a bracket 82 which is secured to trough 50 by two bolt means 84. Oppositely pitched helical screws 86, 87 are secured to shafts 78 and also act to move material axially in both directions in the sub-troughs 50. A pinion 79 is secured to the outer end of shaft 78 nd drivingly meshes with pinion 73. The pinions can be easily engaged with one another, in assembling the mechanism, by sliding the pinions together endwise.

Spaced along the longitudinal length of trough 50 at its bottom side are a series of collars 80 which are in material receiving communication with trough 50 through apertures 88. It will be noted that apertures 88 are staggered along the trough 50 in respect to apertures 56 in plate 55. By this means when the machine is stopped, material will not continue to flow from hopper 24 and it is therefore unnecessary to close the metering shutter at the end of each row or when the machine is being transported. The setting of the metering shutter therefore need not be disturbed on this account.

The flexible, telescoping conduits 28 slip over collars 80 and place the hopper 24 in material delivering communication with the funnels 22.

Each of the lower troughs 42 are hinged at their forward sides to permit them to be quickly and easily swung away from the hopper 24 and thereby open up the distributor for cleaning purposes. The troughs 42 can be completely removed from the hopper 24 as follows. Separable hinges are provided for hinging the troughs to the hopper in the form of bifurcated brackets 90 which are attached along the forward side of hopper 24 and each have a pin 91 secured between their lower ends forming a pivot. Brackets 92 are similarly spaced along the length of troughs 42 and secured thereto by bolt means 93. The brackets 92 have a hook portion 94 which rests on and embraces their respective pins 91 and about which they pivot. Along the rear side of the hopper 24 are secured pins 95 which are engageable by the wire yoke 96 of the conventional over-center latches 97 which are secured by bolts 98 to the troughs 42. As viewed in Figure 1, when the lever 99 is pulled away from the trough 42, the yokes 96 are freed from their respective pins 95 and the trough 42 is free to drop, swinging about pivots 91. The drive chain 100 has thereby been slackened and is easily removed from its sprocket 104 secured to shaft 78. The spring 118 for the chain tightener 102 is then also easily removed. As the hinges are separable, the entire bottom assembly, comprising troughs 42, metering shutter, rotary feed members 76 and conduits 28 can then be lifted from the machine. The bottom of hopper 24 is thus completely opened for easy and thorough cleaning. By simply removing bolts 84 each of the feed members 76 can be slipped endwise from their brackets 83 and entirely removed from the trough for thorough cleaning. The shutters can then be slipped out endwise in an axial direction from their brackets 58. The bottom assembly can then be inverted and easily and thoroughly emptied and cleaned.

Drive is furnished to chain 100 by an intermediate shaft 106 which is suitably journalled in bearings 108, 110, which in turn are bolted to the support frame. A sprocket 112 is secured to shaft 106 and chain 100 is trained thereover. Shaft 106 is usually driven by the ground wheels (not shown) through any suitable mechanism, such as the sprocket 114 and chain 116 in the conventional manner. The large and heavy main hopper 24 remains in its fixed place in the machine, yet the distributor can be easily and quickly disassembled. Not only do the end support plates 30, 31 assist in supporting the hopper 24, but they also act as weather and safety shields for the drive mechanism at each end of the machine.

I claim:

1. In a distributing mechanism, the combination including, a support frame, an elongated material hopper rigidly secured to said frame, said hopper having a detachable bottom trough assembly hingedly mounted along one of its sides, said assembly including a rotatable feed member, quick detachable locking means for securing said assembly to the other side of said hopper, a driven member mounted on said frame beneath said hopper, a flexible driving connection extending from said driven member to said feed member for rotating the latter whereby said driving connection becomes slack for easy disconnection when said trough is swung from said hopper.

2. In a distributing mechanism, the combination including, a support frame, an elongated material hopper rigidly secured to said frame, a first rotatable feed member mounted in said hopper, said hopper having a completely detachable bottom trough assembly hingedly mounted along one of its sides, quick detachable locking means for securing said assembly to the other side of the hopper, a second rotatable feed member mounted in said trough, a drive connection between said feed members, quick detachable drive means between said feed members, said trough having a plurality of spaced openings along its length through which said first feed member is adapted to feed material, said trough also having a metering shutter slidably mounted for registering with said openings.

3. In a distributing mechanism, the combination including, a support frame, an elongated material hopper rigidly secured to said frame, a first rotatable feed member mounted in said hopper, said hopper having a completely detachable bottom trough assembly hingedly mounted along one of its sides, quick detachable locking means for securing said assembly to the other side of said hopper, a second rotatable feed member mounted in said trough, a drive connection between said feed members, quick detachable drive means between said frame and one of said feed members, said trough having a plurality of spaced openings along its length through which said first feed member is adapted to feed material, said trough also having a metering shutter slidably mounted for registery wtih said openings, said shutter being offset forwardly of a vertical plane passing longitudinally through the center of said first feed member with respect to the direction of feed member rotation at its lower side.

4. In a distributing mechanism, the combination including, a support frame, an elongated material hopper rigidly secured to said frame, a first rotatable feed member mounted in said hopper, said hopper having a detachable bottom trough assembly hingedly mounted along one of its sides, quick detachable locking means for securing said assembly to the other side of said hopper, said assembly having an apertured bottom plate through which said first feed member is adapted to feed material, said assembly also having a sub-trough below said plate a second rotatable feed member mounted in said sub-trough, detachable drive means between said frame and assembly.

5. A device as defined in claim 4 further characterized in that said apertured bottom plate is offset forwardly of a vertical plane passing longitudinally through the center of said first feed member in respect to the direction of first feed member rotation at its lower side.

References Cited in the file of this patent

UNITED STATES PATENTS

| 1,426,671 | Printz | Aug. 22, 1922 |
| 2,345,804 | Gemberling et al. | Apr. 4, 1944 |
| 2,631,760 | Hoppes | Mar. 17, 1953 |
| 2,661,125 | Ganrud | Dec. 1, 1953 |
| 2,717,104 | Hoppes | Sept. 6, 1955 |
| 2,797,847 | Barber et al. | July 2, 1957 |